(12) United States Patent
Remboski et al.

(10) Patent No.: US 10,882,527 B2
(45) Date of Patent: Jan. 5, 2021

(54) TORQUE MODULATION TO LINEARIZE TIRE SLIP CHARACTERISTICS

(71) Applicant: Neapco Intellectual Property Holdings, LLC, Farmington Hills, MI (US)

(72) Inventors: Donald Remboski, Ann Arbor, MI (US); Jacqueline Dedo, Wolverine Lake, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 178 days.

(21) Appl. No.: 16/188,567

(22) Filed: Nov. 13, 2018

(65) Prior Publication Data

US 2019/0143986 A1 May 16, 2019

Related U.S. Application Data

(60) Provisional application No. 62/585,728, filed on Nov. 14, 2017.

(51) Int. Cl.
*B60W 30/18* (2012.01)
*B60W 10/04* (2006.01)
*B60W 40/12* (2012.01)
*B60T 8/17* (2006.01)
*B60W 40/10* (2012.01)
(Continued)

(52) U.S. Cl.
CPC ....... *B60W 30/18172* (2013.01); *B60K 28/16* (2013.01); *B60T 8/172* (2013.01);
(Continued)

(58) Field of Classification Search
CPC ......... B60W 30/18172; B60W 40/101; B60W 10/04; B60W 40/12; B60W 2050/0048;
(Continued)

(56) References Cited

U.S. PATENT DOCUMENTS

| 4,679,866 A | 7/1987 | van Zanten et al. |
| 5,731,669 A | 3/1998 | Shimizu et al. |

(Continued)

FOREIGN PATENT DOCUMENTS

| DE | 19654427 A1 | 6/1998 |
| DE | 10337086 A1 | 3/2004 |
| FR | 2990656 A1 | 11/2013 |

OTHER PUBLICATIONS

International Search Report dated Jan. 29, 2019; PCT/US2018/060870; 5 pages.

*Primary Examiner* — Rodney A Butler
(74) *Attorney, Agent, or Firm* — Dickinson Wright PLLC

(57) ABSTRACT

A control system for a driveline of a vehicle and method of operating the control system are provided. The system includes a base torque calculation module in communication with a plurality of vehicle controllers. The base torque calculation module determines and outputs a wheel torque command signal. A torque modulation module generates a periodic torque modulation signal based on the wheel torque command signal and a plurality of tire parameters. An adder module adds the periodic torque modulation signal to the wheel torque command signal and outputs a modulated wheel torque command signal to a wheel torque generator to linearize a tire characteristic of the plurality of tires of the vehicle. A slip and force determining module determines and outputs a plurality of slip estimates and estimated forces and a plurality of tire parameters to the torque modulation module, the plurality of vehicle controllers, and base torque calculation module.

15 Claims, 8 Drawing Sheets

(51) Int. Cl.
    *B60T 8/175*     (2006.01)
    *B60K 28/16*     (2006.01)
    *B60T 8/172*     (2006.01)
    *B60W 40/101*     (2012.01)
    *B60W 50/00*     (2006.01)

(52) U.S. Cl.
    CPC ............ *B60T 8/175* (2013.01); *B60W 10/04* (2013.01); *B60W 40/101* (2013.01); *B60W 40/12* (2013.01); *B60W 2050/0048* (2013.01); *B60W 2510/0657* (2013.01); *B60W 2510/083* (2013.01); *B60W 2520/26* (2013.01); *B60W 2520/28* (2013.01); *B60W 2520/30* (2013.01); *B60W 2710/0666* (2013.01); *B60W 2710/083* (2013.01); *B60W 2720/26* (2013.01); *B60W 2720/30* (2013.01)

(58) Field of Classification Search
    CPC ... B60W 2510/0657; B60W 2510/083; B60W 2720/30; B60W 2520/28; B60W 2520/30; B60W 2710/0666; B60W 2710/083; B60W 2720/26; B60W 2520/26; B60W 2530/20; B60T 8/175; B60T 8/172; B60K 28/16
    See application file for complete search history.

(56) References Cited

U.S. PATENT DOCUMENTS

| | | |
|---|---|---|
| 5,925,083 A | 7/1999 | Ackermann |
| 7,509,204 B2 | 3/2009 | Phillips et al. |
| 7,983,801 B2 | 7/2011 | Milot |
| 8,497,646 B2 | 7/2013 | Yamada et al. |
| 8,626,389 B2 | 1/2014 | Sidlosky |
| 9,419,549 B2 | 8/2016 | Yim et al. |
| 2002/0134637 A1 | 9/2002 | Salecker et al. |
| 2005/0119817 A1 | 6/2005 | Pelchen et al. |
| 2007/0106446 A1 | 5/2007 | Phillips et al. |
| 2009/0210128 A1 | 8/2009 | Fujimoto et al. |
| 2009/0234551 A1 | 9/2009 | Aswani et al. |
| 2009/0317266 A1* | 12/2009 | Rampen ............... F04B 49/065 417/53 |
| 2011/0273125 A1 | 11/2011 | Yamada et al. |
| 2012/0203405 A1* | 8/2012 | Wang ................... B60W 20/50 701/22 |
| 2015/0175010 A1 | 6/2015 | Tang |
| 2015/0239475 A1 | 8/2015 | Bayar et al. |
| 2017/0217314 A1 | 8/2017 | Bachman |
| 2017/0291609 A1* | 10/2017 | Reich .................. B60W 10/023 |
| 2018/0134291 A1* | 5/2018 | Burford ............... B60W 40/06 |

\* cited by examiner

TORQUE MODULATION TO LINEARIZE TIRE SLIP CHARACTERISTICS

CROSS REFERENCE TO RELATED APPLICATIONS

This utility application claims the benefit of U.S. Provisional Application No. 62/585,728 filed Nov. 14, 2017. The entire disclosure of the above application is incorporated herein by reference.

FIELD

The present disclosure relates generally to a control system for a driveline of a vehicle. The present disclosure also relates to a method of operating the control system.

BACKGROUND

This section provides background information related to the present disclosure which is not necessarily prior art.

Vehicle tires lose traction and slip as longitudinal or lateral forces increase to the point where the tire's frictional contact with the road is no longer sufficient to hold. The relationship between tire slip and lateral/longitudinal forces is highly non-linear and difficult to determine due to changing tire and road conditions. This makes control of the vehicle in slip conditions (i.e., when the tires lose traction) difficult and subjects all automatic vehicle chassis and brake controls to limit cycle behavior.

Current chassis stability programs use measured tire slip to determine the tire's contact patch performance. The methods of changing contact patch forces are currently limited to driving torque modulation (e.g., from an internal combustion engine), brake force modulation, and differential clutch modulation. So, current vehicle control systems may, for example, monitor tire slip and respond with force reducing actions (e.g., torque reduction, braking reduction) to limit slip. However, these methods are all relatively slow-acting and the action of responding to slip conditions can introduce a strong low-frequency limit cycle into the vehicle controls. Such a limit cycle generally does not make optimal use of the tire's capability and is difficult to control and introduces unwanted vibration into the vehicle's chassis. This creates noise, vibration, and harshness (NVH) that can be undesirable to passengers and cargo. Accordingly, there remains a need for an improved control system for a driveline of the vehicle.

SUMMARY

This section provides a general summary of the present disclosure and is not a comprehensive disclosure of its full scope or all of its features and advantages.

It is an object of the present disclosure to provide a control system for a driveline of a vehicle. The control system includes a memory unit storing program instructions for operating the control system. The control system also includes a processor in communication with a plurality of vehicle controllers and coupled to the memory unit and a wheel torque generator for receiving a plurality of driver inputs and a plurality of sensor inputs from a plurality of sensors. The processor is configured to determine a wheel torque command signal and a plurality of tire parameters of a plurality of tires of the vehicle and generate a periodic torque modulation signal based on the wheel torque command signal and the plurality of tire parameters. In addition, the processor is configured to add the periodic torque modulation signal to the wheel torque command signal and output a modulated wheel torque command signal to the wheel torque generator to linearize a tire characteristic of the plurality of tires of the vehicle.

It is another object of the present disclosure to provide a control system that addresses and overcomes the above-noted shortcomings. The control system includes a base torque calculation module in communication with a plurality of vehicle controllers. The base torque calculation module is configured to receive a plurality of driver inputs and a plurality of sensor inputs. The base torque calculation module is additionally configured to communicate with the plurality of vehicle controllers to determine and output a wheel torque command signal accordingly. A torque modulation module is coupled to the base torque calculation module and is configured to receive the wheel torque command signal and the plurality of tire parameters. The torque modulation module generates a periodic torque modulation signal based on the wheel torque command signal and the plurality of tire parameters. The periodic torque modulation signal has a modulation amplitude and a modulation frequency. An adder module is coupled to the base torque calculation module and the torque modulation module for adding the periodic torque modulation signal from the torque modulation module to the wheel torque command signal from the base torque calculation module. The adder module outputs a modulated wheel torque command signal to a wheel torque generator to linearize a tire characteristic of the plurality of tires of the vehicle. A slip and force determining module is coupled to the base torque calculation module and the torque modulation module and is in communication with the plurality of vehicle controllers. The slip and force determining module is configured to receive the plurality of sensor inputs and determine the plurality of tire parameters and outputs the plurality of tire parameters to the base torque calculation module and the torque modulation module and the plurality of vehicle controllers.

It is yet another aspect of the disclosure to provide a computer program including program instructions tangibly stored on a computer-readable medium and operable when executed to cause a processor to perform a method of operating a control system for a driveline of a vehicle. The method begins by communicating with a plurality of vehicle controllers using a base torque calculation module. The method continues with the step of receiving a plurality of sensor inputs using the base torque calculation module. The method then determines a plurality of tire parameters of a plurality of tires of the vehicle using a slip and force determining module. Next, the method proceeds by determining a wheel torque command signal based on the communication with the plurality of vehicle controllers and the plurality of sensor inputs and the plurality of tire parameters using the base torque calculation module. The method also outputs the wheel torque command signal using the base torque calculation module and generates a periodic torque modulation signal based on the wheel torque command signal and the plurality of tire parameters using a torque modulation module. The method also includes adding the periodic torque modulation signal to the wheel torque command signal from the base torque calculation module using an adder module. The method then outputs a modulated wheel torque command signal to a wheel torque generator driving the plurality of tires of the vehicle using the adder module. The method concludes by linearizing a tire characteristic of the plurality of tires in response to the modulated wheel torque command signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

In the following description, details are set forth to provide an understanding of the present disclosure. In some instances, certain circuits, structures and techniques have not been described or shown in detail in order not to obscure the disclosure.

In general, the present disclosure relates to a control system for a driveline of a vehicle of the type well-suited for use in many applications. The control system and associated methods of operation of this disclosure will be described in conjunction with one or more example embodiments. However, the specific example embodiments disclosed are merely provided to describe the inventive concepts, features, advantages and objectives will sufficient clarity to permit those skilled in this art to understand and practice the disclosure. Specifically, the example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
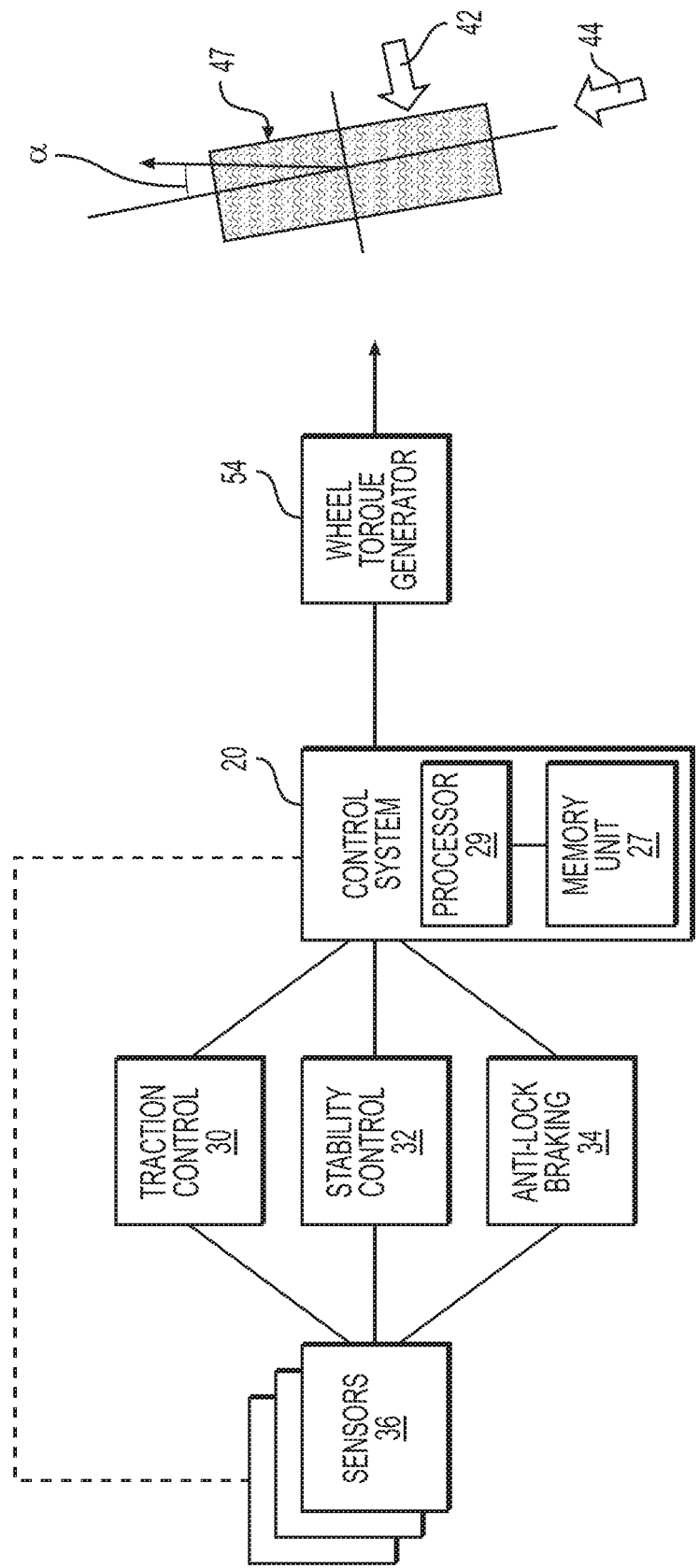
FIGS. 1 and 2 illustrate a control system for a driveline of a vehicle according to aspects of the disclosure.
Figure 2:
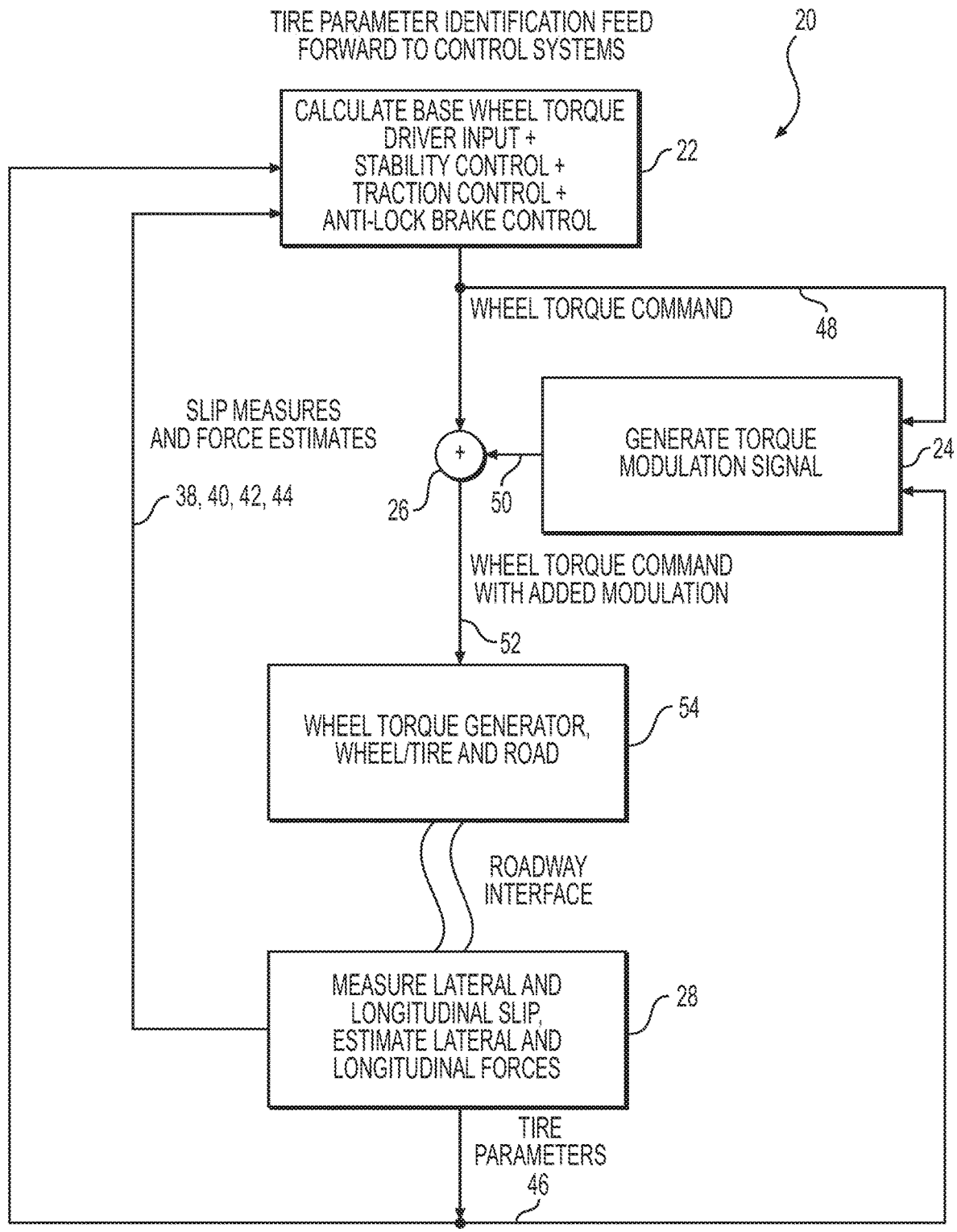

Referring to the Figures, wherein like numerals indicate corresponding parts throughout the several views, a control system 20 for a driveline of a vehicle is provided. The control system 20 includes multiple modules 22, 24, 26, 28 that can, for example, be implemented using software stored in a memory unit 27 and executed on a processor 29 that is coupled to the memory unit 27. As best shown in FIGS. 1 and 2, the control system 20 includes a base torque calculation module 22 in communication with a plurality of vehicle controllers (e.g., traction controller 30, stability controller 32, anti-lock braking controller 34). The base torque calculation module 22 is configured to receive a plurality of driver inputs (e.g., torque demand, braking demand, yaw demand/steering) and a plurality of sensor inputs from a plurality of sensors 36. It should be understood that the plurality of sensor inputs may be communicated from the plurality of vehicle controllers 30, 32, 34 and/or may be communicated from the plurality of sensors 36 directly to the control system 20 (if the plurality of sensors 36 are directly connected to the control system 20, shown by the dashed line in FIG. 1).

The base torque calculation module 22 is also configured to receive a plurality of lateral slip estimates 38 and a plurality of longitudinal slip estimates 40. Additionally, the base torque calculation module 22 is configured to receive a plurality of estimated lateral forces 42 and a plurality of estimated longitudinal forces 44 and a plurality of tire parameters 46 of a plurality of tires 47 of the vehicle. The base torque calculation module 22 communicates with the plurality of vehicle controllers 30, 32, 34 to determine and output a wheel torque command signal 48 accordingly. Specifically, the plurality of vehicle controllers 30, 32, 34 may calculate, and often limit, wheel torque based on traction and vehicle stability conditions. The wheel torque command signal 48 may be for both accelerating and braking.

A torque modulation module 24 is coupled to the base torque calculation module 22 and is configured to receive the wheel torque command signal 48 and the plurality of tire parameters 46. The torque modulation module 24 generates a periodic torque modulation signal 50 based on the wheel torque command signal 48 and the plurality of tire parameters 46. According to an aspect, the periodic torque modulation signal 50 can be generated on an intermittent basis and/or may be initiated or altered in response to operating conditions or environment of the vehicle changing (e.g., as detected by the plurality of sensors 36 and received by the processor 29 as the plurality of sensor inputs).

Figure 3:
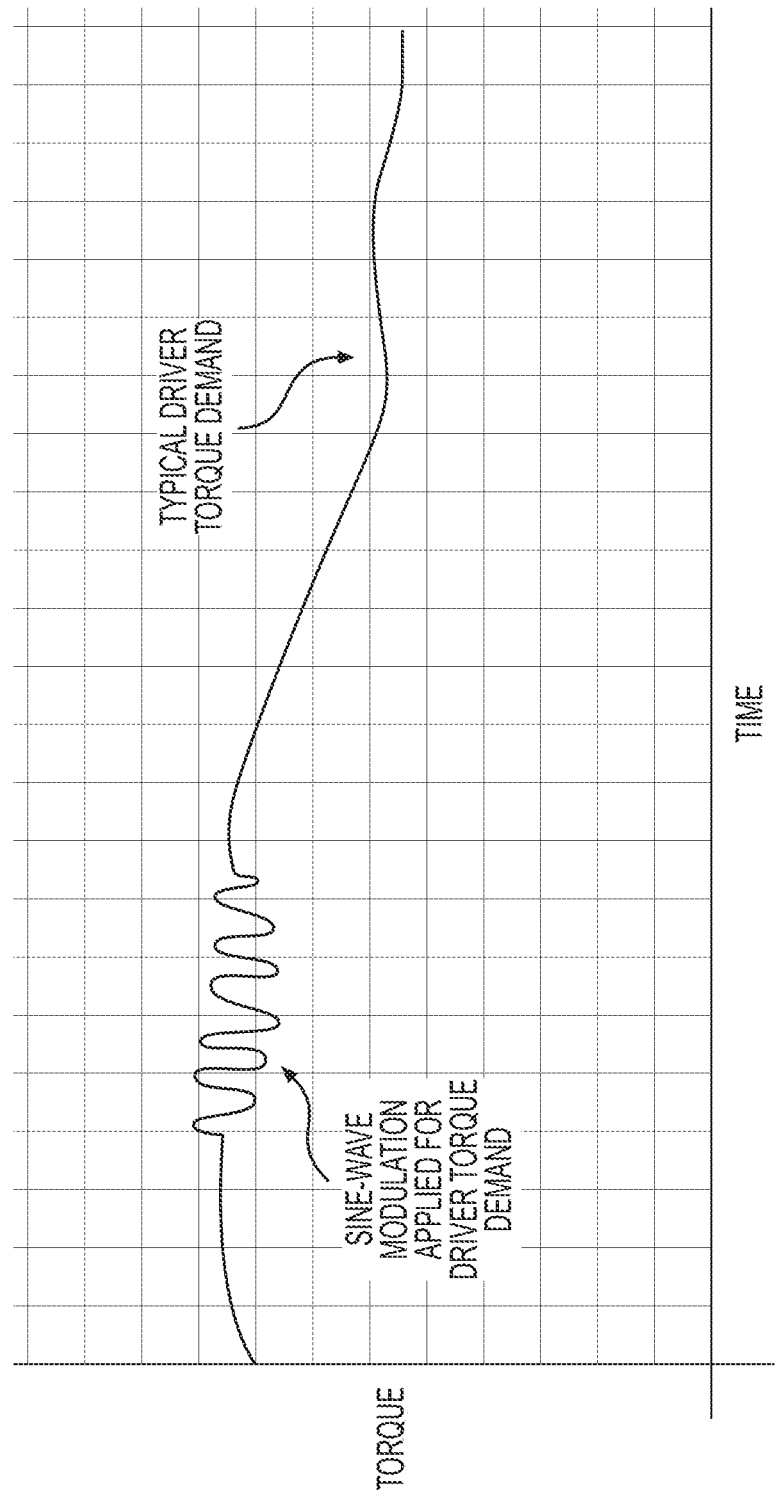
FIG. 3 illustrates a modulated wheel torque command signal of the control system of FIGS. 1 and 2 according to aspects of the disclosure.

An adder module 26 is coupled to the base torque calculation module and the torque modulation module 24 for adding the periodic torque modulation signal 50 from the torque modulation module 24 to the wheel torque command signal 48 from the base torque calculation module 22. The adder module 26 outputs a modulated wheel torque command signal 52 to a wheel torque generator 54 (e.g., electric motor and/or motor drive electronics). Specifically, in slip conditions, the torque driving the wheel, based on the wheel torque command signal 48, can be modulated by the periodic torque modulation signal 50 having a modulation amplitude and a modulation frequency at a relatively high frequency to induce slip and grip cycles. This modulation is accomplished by adding an alternating modulating signal (i.e., periodic torque modulation signal 50) to the average torque driving the wheel (i.e., wheel torque command signal 48), as best shown in FIG. 3. The modulation amplitude and modulation frequency can be dependent on operating conditions. For example, in low traction circumstances, the modulation amplitude would be reduced. The magnitude or modulation amplitude and/or modulation frequency of the periodic torque modulation signal 50 may be altered to minimize noise, vibration, and harshness (NVH) effects on the vehicle (e.g., avoid exciting chassis or driveline resonances).

Figure 4:
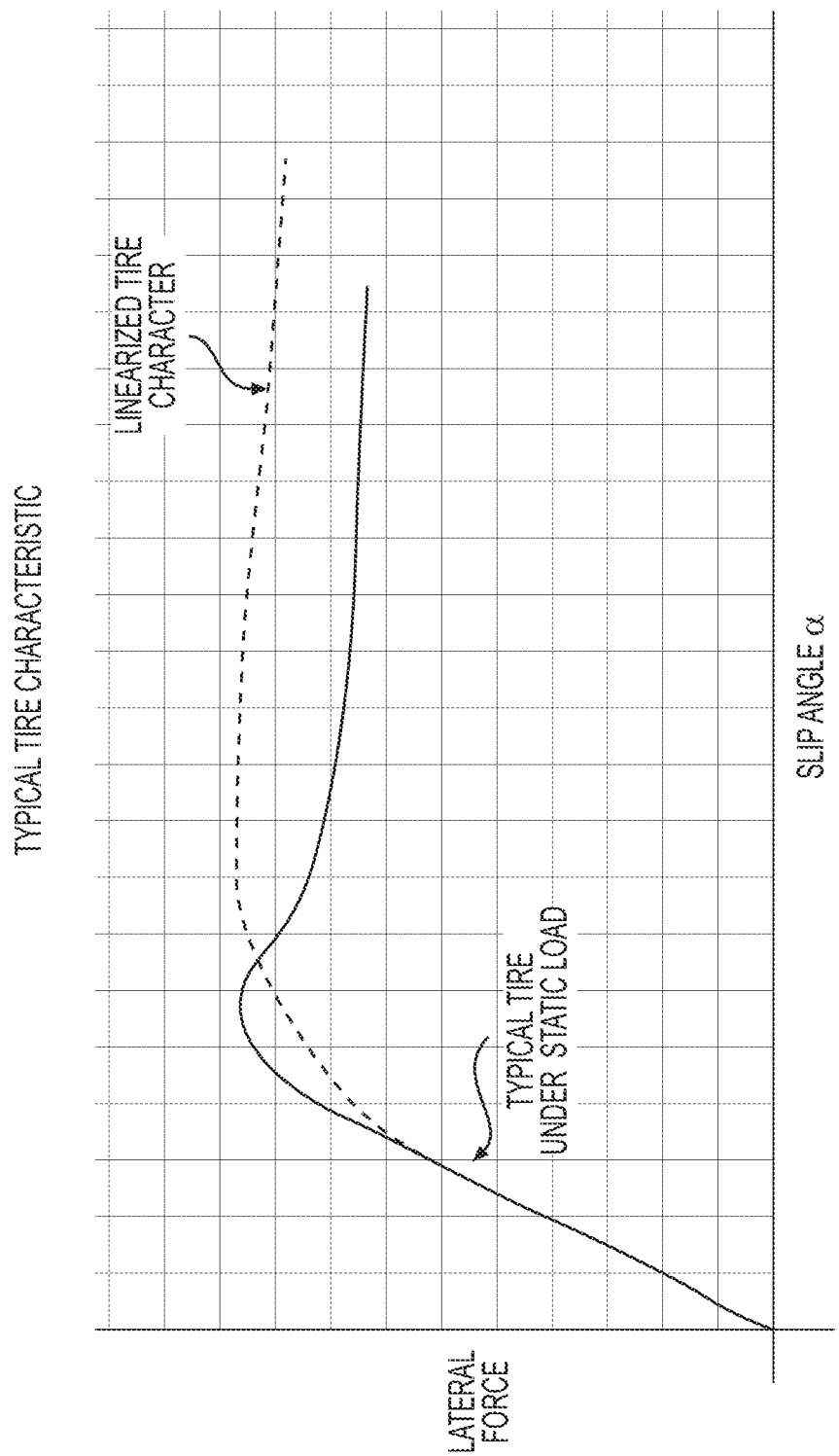
FIG. 4 illustrates an example tire characteristic according to aspects of the disclosure.
Figure 5:
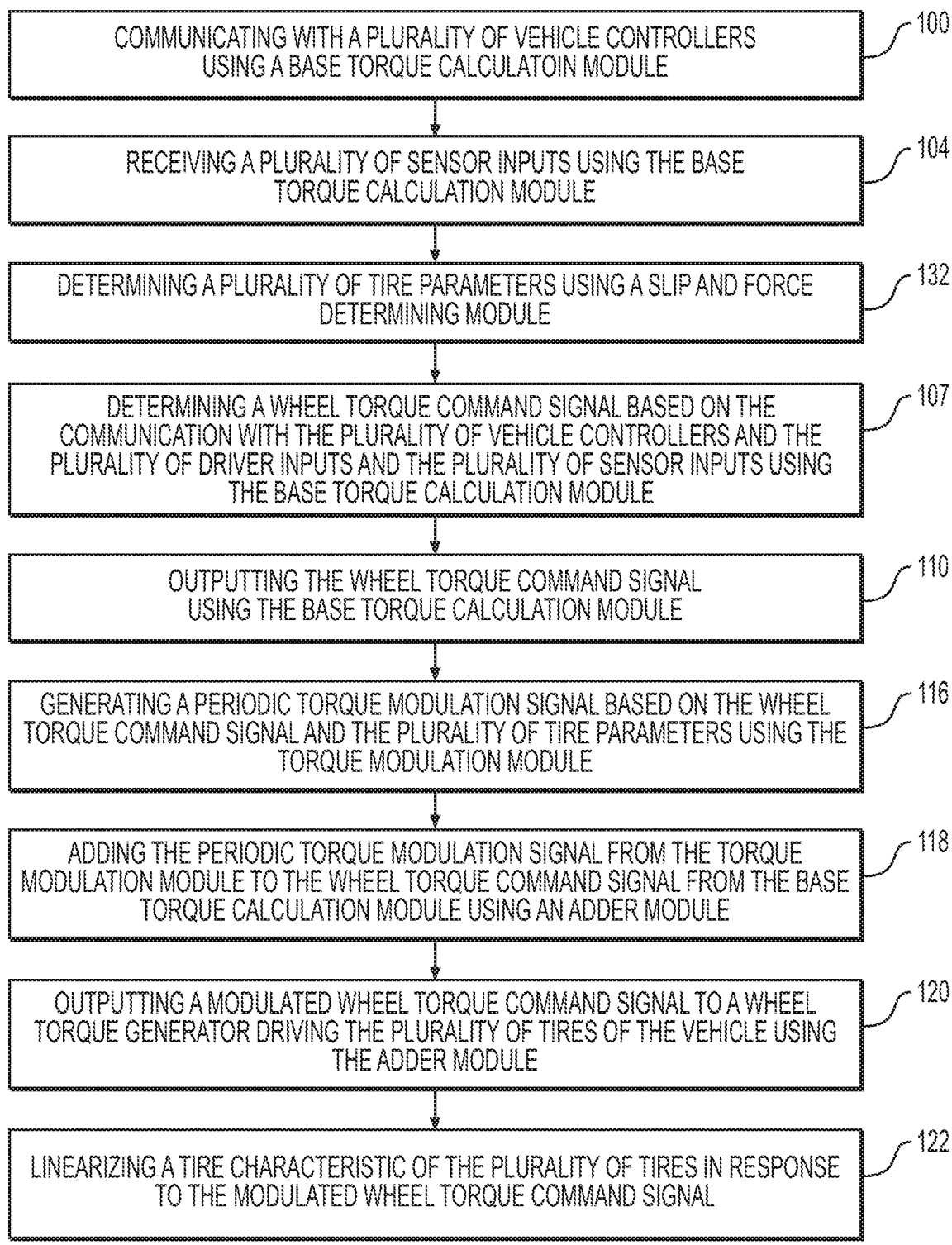
FIGS. 5 and 6A-6C illustrate a method of operating the control system of FIGS. 1 and 2 according to aspects of the disclosure.
Figure 6A:
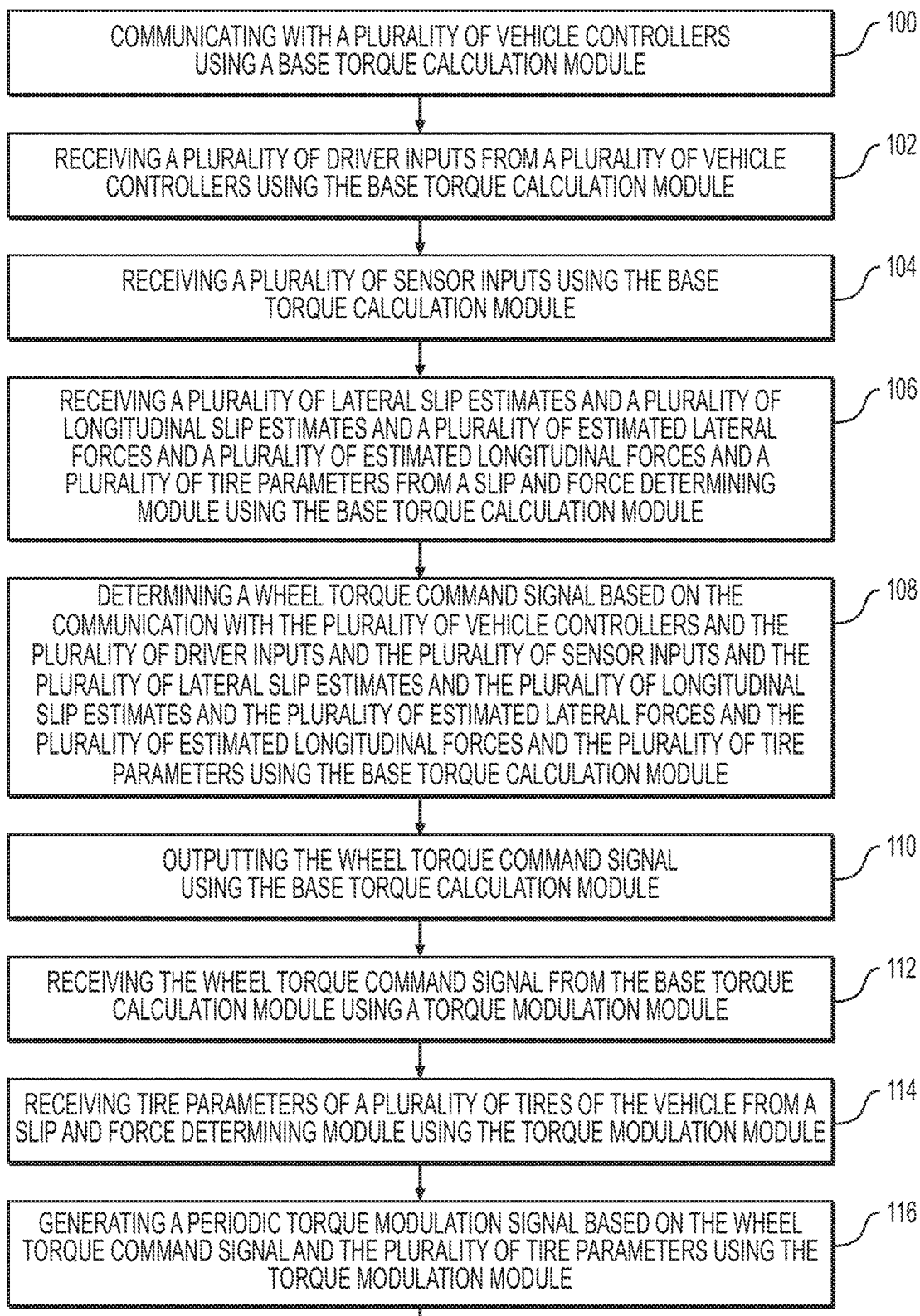
Figure 6B:
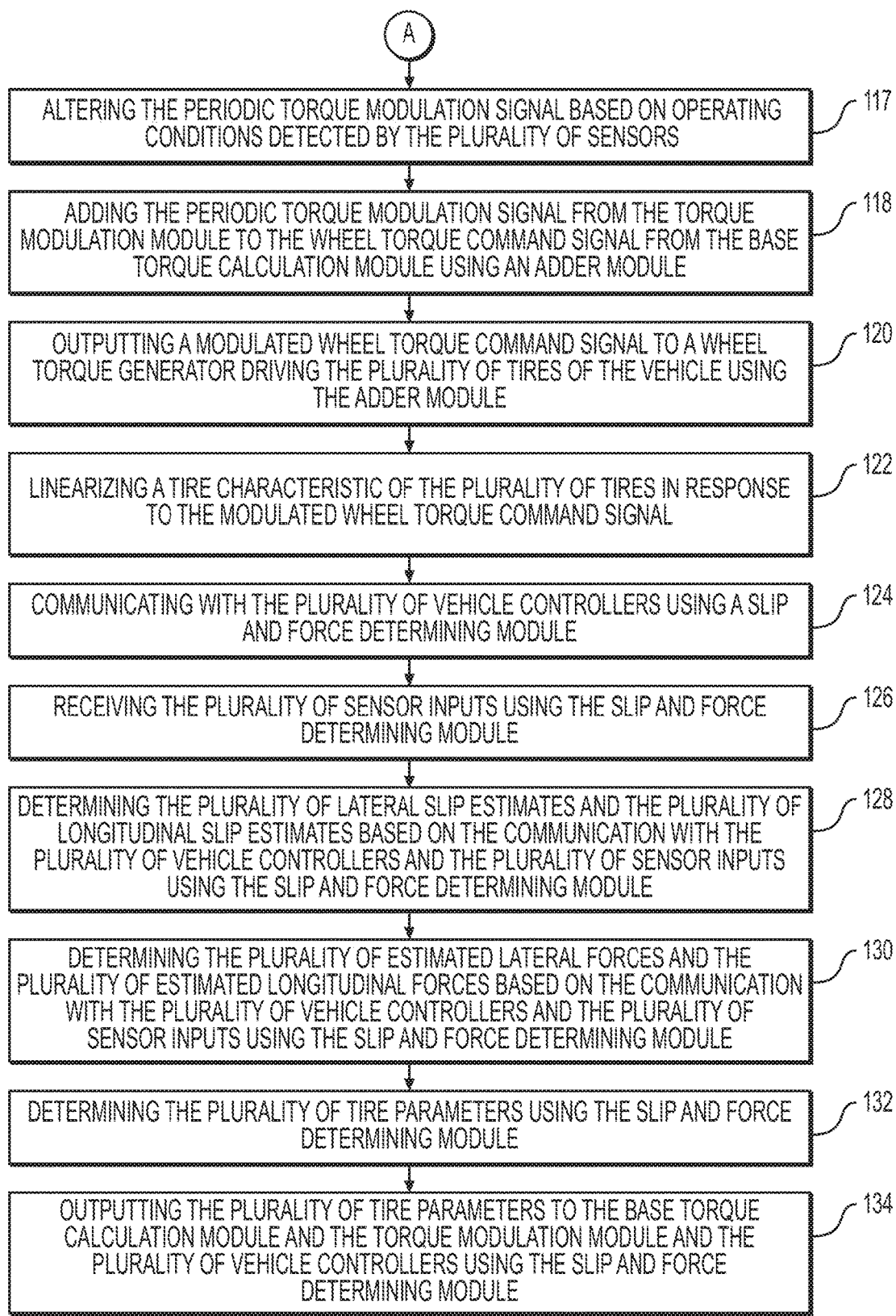
Figure 6C:
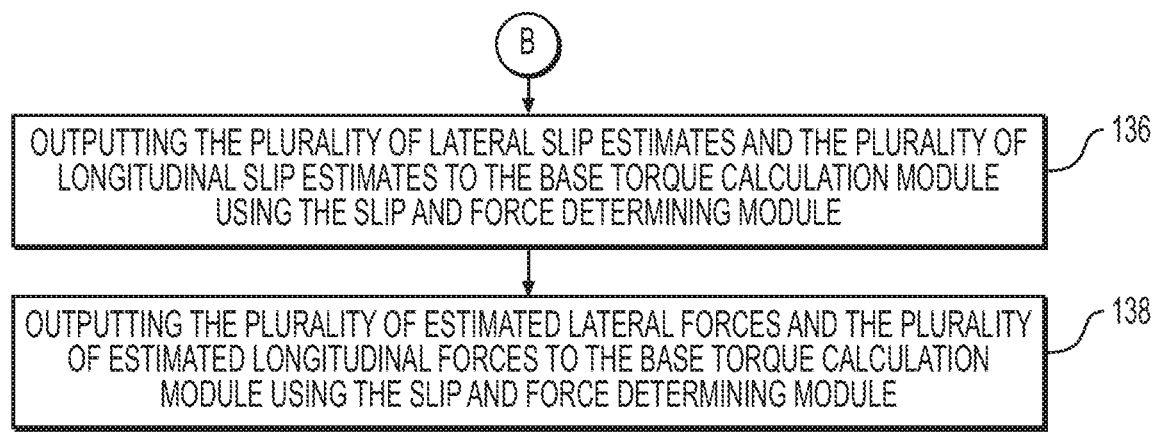

According to an aspect, a typical modulation frequency of the periodic torque modulation signal 50 would be four sinusoidal torque fluctuations per revolution of each of the plurality of tires 47 of the vehicle (4th order). This rate may be modified to adjust for vehicle speed (e.g., from wheel speed sensors included in the plurality of sensors 36), configuration of the tires 47 or other factors. Such a modulation technique is enabled by the rapid torque changes possible in an electric motor driveline. The effect of this modulation is to linearize the relationship between tire slip and forces or a tire characteristic of the plurality of tires 47 of the vehicle. An example plot of a tire characteristic (force vs. slip angle α) is shown in FIG. 4. An overall vehicle stability control system (e.g., stability controller 32) may include a linearized mode of operation in low traction situations. When low traction or high slip conditions are present, the control system 20 will apply a modulating signal to a base torque command. This has the effect of linearizing the tire's slip vs. force characteristic or tire characteristic, which simplifies operation of the stability controller 32.

A slip and force determining module 28 is coupled to the base torque calculation module 22 and the torque modulation module 24 and is in communication with the plurality of vehicle controllers 30, 32, 34. The slip and force determining module 28 is configured to receive the plurality of sensor inputs and is configured to determine the plurality of tire parameters 46. The slip and force determining module 28 outputs the plurality of tire parameters 46 to the base torque calculation module 22 and the torque modulation module 24 and the plurality of vehicle controllers 30, 32, 34. So, the control system 20 uses the fast-acting torque response of an electric motor to rapidly test contact patch performance in circumstances when the contact patch is at its adhesion limit. This is accomplished by imposing a very rapid torque modulation on the electric normal drive forces. This drives the contact patch through repeated slip/grip cycles. By observing the tire's performance through repeated slip/grip cycles a chassis stability program (e.g., stability control 32) gains a better tire slip measurement. In very low friction situations, driving the tire through rapidly repeated slip/grip cycles advantageously provides better mobility.

The slip and force determining module 28 also determines the plurality of lateral slip estimates 38 and the plurality of longitudinal slip estimates 40 based on the communication with the plurality of vehicle controllers 30, 32, 34 and the plurality of sensor inputs. Longitudinal slip estimation is from wheel accelerations of the plurality of tires 47 (e.g., obtained by differentiating a plurality of wheel speed signals from a plurality of wheel speed sensors included amongst the plurality of sensors 36), applied torque (e.g., the wheel torque command signal), and a vehicle speed reference (e.g., using a combination of wheel speed signals and other speed references, such as from a global positioning system). Lateral slip estimation is typically from yaw rate and steering as augmented by other sensors (e.g., others of the plurality of sensors 36). The slip and force determining module 28 additionally determines the plurality of estimated lateral forces 42 and the plurality of estimated longitudinal forces 44 based on the communication with the plurality of vehicle controllers 30, 32, 34 and the plurality of sensor inputs. Estimation of these forces 42, 44 is from measured accelerations (e.g., from an accelerometer included as one of the plurality of sensors 36) and an estimate of vehicle mass and vehicle moments. The slip and force determining module 28 also outputs the plurality of lateral slip estimates 38 and the plurality of longitudinal slip estimates 40 and the plurality of estimated lateral forces 42 and the plurality of estimated longitudinal forces 44 to the base torque calculation module 22.

As best shown in FIGS. 5 and 6A-6C, a method of operating a control system 20 for a driveline of a vehicle is additionally provided. Such a method can, for example, be stored as program instructions in the memory unit 27 and executed or carried out by the processor 29. The method begins by 100 communicating with a plurality of vehicle controllers 30, 32, 34 using a base torque calculation module 22. The method continues with the step of 102 receiving a plurality of driver inputs from a plurality of vehicle controllers 30, 32, 34 using the base torque calculation module 22. The next step of the method is 104 receiving a plurality of sensor inputs using the base torque calculation module 22. The method proceeds with the step of 106 receiving a plurality of lateral slip estimates 38 and a plurality of longitudinal slip estimates 40 and a plurality of estimated lateral forces 42 and a plurality of estimated longitudinal forces 44 and a plurality of tire parameters 46 from a slip and force determining module 28 using the base torque calculation module 22.

The method then continues with the step of 107 determining a wheel torque command signal 48 based on the communication with the plurality of vehicle controllers 30, 32, 34 and the plurality of sensor inputs and the plurality of tire parameters using the base torque calculation module 22. More specifically, the step 107 can include the step of 108 determining a wheel torque command signal 48 based on the communication with the plurality of vehicle controllers 30, 32, 34 and the plurality of driver inputs and the plurality of sensor inputs and the plurality of lateral slip estimates 38 and the plurality of longitudinal slip estimates 40 and the plurality of estimated lateral forces 42 and the plurality of estimated longitudinal forces 44 and the plurality of tire parameters 46 using the base torque calculation module 22. The method also includes the step of 110 outputting the wheel torque command signal 48 using the base torque calculation module 22.

The method proceeds with the step of 112 receiving the wheel torque command signal 48 from the base torque calculation module 22 using a torque modulation module 24. Next, 114 receiving tire parameters 46 of a plurality of tires 47 of the vehicle from a slip and force determining module 28 using the torque modulation module 24. The method also includes the step of 116 generating a periodic torque modulation signal 50 based on the wheel torque command signal 48 and the plurality of tire parameters 46 using the torque modulation module 24. The method can also include the step of 117 altering the periodic torque modulation signal 50 based on operating conditions detected by the plurality of sensors 36. The method continues with the step of 118 adding the periodic torque modulation signal 50 from the torque modulation module 24 to the wheel torque command signal 48 from the base torque calculation module 22 using an adder module 26. The next step of the method is 120 outputting a modulated wheel torque command signal 52 to a wheel torque generator 54 driving the plurality of tires 47 of the vehicle using the adder module 26. The method also includes the step of 122 linearizing a tire characteristic of the plurality of tires 47 in response to the modulated wheel torque command signal 52.

The method additionally includes the step of 124 communicating with the plurality of vehicle controllers 30, 32, 34 using a slip and force determining module 28. The method continues by 126 receiving the plurality of sensor 36 inputs using the slip and force determining module 28. The method also includes the step of 128 determining the plurality of lateral slip estimates 38 and the plurality of longitudinal slip estimates 40 based on the communication with the plurality of vehicle controllers 30, 32, 34 and the plurality of sensor 36 inputs using the slip and force determining module 28. The method proceeds with the step of 130 determining the plurality of estimated lateral forces 42 and the plurality of estimated longitudinal forces 44 based on the communication with the plurality of vehicle controllers 30, 32, 34 and the plurality of sensor inputs using the slip and force determining module 28. Then, 132 determining the plurality of tire parameters 46 using the slip and force determining module 28. The method continues with the step of 134 outputting the plurality of tire parameters 46 to the base torque calculation module 22 and the torque modulation module 24 and the plurality of vehicle controllers 30, 32, 34 using the slip and force determining module 28. The method then includes the step of 136 outputting the plurality of lateral slip estimates 38 and the plurality of longitudinal slip estimates 40 to the base torque calculation module 22 using the slip and force determining module 28. The method also includes the step of 138 outputting the plurality of estimated lateral forces 42 and the plurality of estimated longitudinal forces 44 to the base torque calculation module 22 using the slip and force determining module 28.

Clearly, changes may be made to what is described and illustrated herein without departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the example control system can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Certain of the devices or systems shown (e.g., control system 20) include a computing system. The computing system includes the processor 29 (CPU) and a system bus that couples various system components including a system memory such as read only memory (ROM) and random access memory (RAM), to the processor. Other system memory may be available for use as well (e.g., memory unit 27). The computing system may include more than one processor 29 or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system. A communications interface generally enables the computing device system to communicate with one or more other computing devices using various communication and network protocols.

The preceding disclosure refers to a number of flow charts and accompanying descriptions to illustrate the embodiments represented in FIGS. 5 and 6A-6C. The disclosed devices, components, and systems contemplate using or implementing any suitable technique for performing the steps illustrated in these figures. Thus, FIGS. 5 and 6A-6C are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device (e.g., memory unit 27), a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor 29 encompasses all kinds of apparatuses, devices, and machines for processing data, including by way of example a programmable processor, a computer, a system on a chip, or multiple ones, or combinations, of the foregoing. The processor 29 can include special purpose logic circuitry, e.g., an FPGA (field programmable gate array) or an ASIC (application-specific integrated circuit). The processor 29 also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

The computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). The computer program can be deployed to be executed on one computer or on multiple computers that are located at one site or distributed across multiple sites and interconnected by a communication network.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A control system for a driveline of a vehicle including a plurlaity of tires, the control system comprising:
    at least one sensor for generating at least one sensor input for the vehicle;
    at least one vehicle controller for generating at least one driver input for the vehicle:
    a processor disposed in electrical communication with said at least one sensor and said at least one controller and configured to:
        receive said at least one driver input from said at least one vehicle controller and said at least one sensor input from said at least one sensor;
        determine a wheel torque command signal and a tire parameter for the plurality of tires of the vehicle;
        generate a periodic torque modulation signal based on said wheel torque command signal and said tire parameter;
        add said periodic torque modulation signal to said wheel torque command signal, and
        output a modulated wheel torque command signal to linearize a tire characteristic of the plurality of tires of the vehicle.

2. The control system as set forth in claim 1, wherein said processor is further configured to alter said periodic torque modulation signal based on said sensor input detected by said at least one sensor.

3. The control system as set forth in claim 1, wherein said wheel torque command signal is for accelerating and braking the vehicle.

4. The control system as set forth in claim 1, wherein said processor is further configured to:
    determine a plurality of lateral slip estimates, a plurality of longitudinal slip estimates, a plurality of estimated lateral forces and a plurality of estimated longitudinal forces based on said at least one driver input and said at least one sensor input received from the at least one controller and the at least one sensors.

5. A control system for a driveline of a vehicle including a plurality of wheels, the control system comprising:
    at least one sensor for generating at least one sensor input for the vehicle;
    at least one vehicle controller for generating at least one driver input for the vehicle:
    a plurality of modules disposed in electrical communication with said at least one sensor and said at least one vehicle controller to receive said at least one sensor input and said at leats one driver input
    said plurality of modules including a base torque calculation module configured to determine and output a wheel torque command signal;
    said plurality of modules including a torque modulation module disposed in electrical communication with said base torque calculation module and configured to receive said wheel torque command signal and generate a periodic torque modulation signal based on said wheel torque command signal and said at least one sensor input, wherein said periodic torque modulation signal has a modulation amplitude and a modulation frequency;
    said plurality of modules including an adder module disposed in electrical communication with said base torque calculation module and said torque modulation module and configured to add said periodic torque modulation signal received from said torque modulation module to said wheel torque command signal from said base torque calculation module and generate a modulated wheel torque command signal to linearize a tire characteristic of the plurality of tires of the vehicle; and
    said plurality of modules including a slip and force determining module disposed in electric communication with said base torque calculation module and said torque modulation module and and configured to determine a plurality of tire parameters.

6. The control system as set forth in claim 5, wherein said torque modulation module is configured to alter at least one of said modulation amplitude or said modulation frequency of said periodic torque modulation signal to minimize noise, vibration, and harshness effects on the vehicle.

7. The control system as set forth in claim 5, wherein said modulation frequency of said periodic torque modulation signal is four sinusoidal torque fluctuations per revolution of each of the plurality of tires of the vehicle.

8. The control system as set forth in claim 5, wherein said slip and force determining module is further configured to determine a plurality of lateral slip estimates, a plurality of longitudinal slip estimates, a plurality of estimated lateral forces and a plurality of estimated longitudinal forces and output said plurality of lateral slip estimates and said plurality of longitudinal slip estimates and said plurality of estimated lateral forces and said plurality of estimated longitudinal forces to said base torque calculation module.

9. The control system as set forth in claim 8, wherein said at least one sensor includes a plurality of wheel speed sensors and said slip and force determining module is further configured to determine a wheel acceleration of the plurality of tires of the vehicle by differentiating a plurality of wheel speed signals from said plurality of wheel speed sensors and determine said longitudinal slip estimate based on said wheel acceleration and said wheel torque command signal and a speed of the vehicle.

10. The control system as set forth in claim 5, wherein said wheel torque command signal is for accelerating and braking the vehicle.

11. A computer program including program instructions tangibly stored on a computer-readable medium and operable when executed to cause a processor to perform a method of operating a control system for a driveline of a vehicle comprising the steps of:
communicating with a plurality of vehicle controllers using a base torque calculation module;
receiving a plurality of sensor inputs using the base torque calculation module;
determining a plurality of tire parameters of a plurality of tires of the vehicle using a slip and force determining module;
determining a wheel torque command signal based on the communication with the plurality of vehicle controllers and the plurality of sensor inputs and the plurality of tire parameters using the base torque calculation module;
outputting the wheel torque command signal using the base torque calculation module;
generating a periodic torque modulation signal based on the wheel torque command signal and the plurality of tire parameters using a torque modulation module;
adding the periodic torque modulation signal to the wheel torque command signal from the base torque calculation module using an adder module;
outputting a modulated wheel torque command signal to a wheel torque generator driving the plurality of tires of the vehicle using the adder module; and
linearizing a tire characteristic of the plurality of tires in response to the modulated wheel torque command signal.

12. The computer program as set forth in claim 11, wherein the method further includes the step of determining a plurality of lateral slip estimates and a plurality of longitudinal slip estimates based on the communication with the plurality of vehicle controllers and the plurality of sensor inputs.

13. The computer program as set forth in claim 12, wherein the method further includes the step of determining a plurality of estimated lateral forces and a plurality of estimated longitudinal forces based on the communication with the plurality of vehicle controllers and the plurality of sensor inputs.

14. The computer program as set forth in claim 13, wherein the step of determining a wheel torque command signal based on the communication with the plurality of vehicle controllers and the plurality of sensor inputs and the plurality of tire parameters is further defined as determining a wheel torque command signal based on the communication with the plurality of vehicle controllers and the plurality of sensor inputs and the plurality of lateral slip estimates and the plurality of longitudinal slip estimates and the plurality of estimated lateral forces and the plurality of estimated longitudinal forces and the plurality of tire parameters.

15. The computer program as set forth in claim 12, wherein the method further includes the step of altering the periodic torque modulation signal based on operating conditions detected by the plurality of sensors.

* * * * *